United States Patent
Juchems et al.

(10) Patent No.: US 12,523,182 B2
(45) Date of Patent: Jan. 13, 2026

(54) FUEL INJECTOR CONTROL STRATEGY USING FUEL BULK MODULUS FOR FUEL INJECTOR COMMAND DETERMINATION

(71) Applicant: Caterpillar Inc., Peoria, IL (US)

(72) Inventors: Mitchell B. Juchems, Eureka, IL (US); Andrew O. Marrack, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/765,911

(22) Filed: Jul. 8, 2024

(65) Prior Publication Data
US 2026/0009363 A1    Jan. 8, 2026

(51) Int. Cl.
*F02D 19/06*    (2006.01)

(52) U.S. Cl.
CPC ..... *F02D 19/0605* (2013.01); *F02D 19/0649* (2013.01); *F02D 19/0673* (2013.01); *F02D 19/0689* (2013.01); *F02D 2200/0602* (2013.01); *F02D 2200/0614* (2013.01)

(58) Field of Classification Search
CPC ............. F02D 19/0605; F02D 19/0649; F02D 19/0673; F02D 19/0689; F02D 2200/0602; F02D 2200/0614
USPC .......................................................... 701/104
See application file for complete search history.

(56) References Cited

U.S. PATENT DOCUMENTS

| | | | |
|---|---|---|---|
| 4,476,837 A * | 10/1984 | Salzgeber | F02D 41/401 123/502 |
| 5,485,822 A * | 1/1996 | Hirose | F02D 41/008 123/357 |
| 6,102,000 A * | 8/2000 | Shindoh | F02D 41/401 123/446 |
| 6,457,463 B1 | 10/2002 | McChesney et al. | |
| 6,557,530 B1 * | 5/2003 | Benson | F02D 41/2496 123/456 |
| 6,805,105 B2 * | 10/2004 | Kato | F02M 21/08 123/514 |
| 8,215,161 B2 * | 7/2012 | Yamada | F02D 41/22 73/114.51 |

(Continued)

FOREIGN PATENT DOCUMENTS

| | | |
|---|---|---|
| CN | 109083790 B | 7/2023 |
| DE | 102012223645 B3 | 2/2014 |

(Continued)

OTHER PUBLICATIONS

Written Opinion and International Search Report for Int'l. Patent Appln. No. PCT/US2025/034307, mailed Oct. 17, 2025 (13 pgs).

*Primary Examiner* — Logan M Kraft
*Assistant Examiner* — John D Bailey
(74) *Attorney, Agent, or Firm* — Brannon Sowers & Cracraft

(57) ABSTRACT

A dual fuel system includes a fuel injector having a fuel pressurization plunger, and a fueling control unit structured to determine a fuel bulk modulus term based upon a volume change value (dV) and a pressure change value (dP) for a fuel pressurized in the fuel injector. The fueling control unit is further structured to determine fuel injector control commands by way of map lookups on fueling maps selected on the basis of the fuel bulk modulus term. Related apparatus and methodology are also disclosed.

20 Claims, 4 Drawing Sheets

(56) References Cited

U.S. PATENT DOCUMENTS

| | | | |
|---|---|---|---|
| 8,285,471 B2* | 10/2012 | Sugiyama | F02D 41/2467 702/182 |
| 9,133,782 B1* | 9/2015 | Convisser | F02D 41/045 |
| 9,243,598 B2* | 1/2016 | Pursifull | F02M 65/002 |
| 11,384,721 B1* | 7/2022 | Schroeder | F02D 19/0655 |
| 11,454,190 B1* | 9/2022 | Pursifull | F02D 41/3845 |
| 12,297,795 B1* | 5/2025 | Schroeder | F02M 55/008 |
| 2002/0152985 A1* | 10/2002 | Wolff | F02D 19/061 123/305 |
| 2004/0134268 A1* | 7/2004 | Tuken | F02D 41/40 73/114.39 |
| 2005/0193982 A1* | 9/2005 | Sakai | F02D 41/3845 123/294 |
| 2008/0302174 A1* | 12/2008 | Puckett | F02M 65/002 73/114.41 |
| 2010/0319445 A1* | 12/2010 | Yamada | F02D 41/22 73/114.51 |
| 2010/0324803 A1* | 12/2010 | Sugiyama | F02D 41/221 701/106 |
| 2012/0167859 A1* | 7/2012 | Basmaji | F02D 19/0628 123/456 |
| 2012/0215421 A1* | 8/2012 | Maruyama | F02D 41/3845 701/104 |
| 2015/0240739 A1* | 8/2015 | Pursifull | F02D 41/3094 123/445 |
| 2015/0240771 A1* | 8/2015 | Pursifull | F02D 41/0025 73/114.41 |
| 2015/0285166 A1* | 10/2015 | Surnilla | F02D 19/0605 123/294 |
| 2015/0300287 A1* | 10/2015 | Ulrey | F02D 41/221 701/103 |
| 2015/0354491 A1* | 12/2015 | Ulrey | F02M 59/368 123/294 |
| 2016/0177860 A1* | 6/2016 | Pursifull | F02D 41/0027 123/294 |
| 2016/0333815 A1* | 11/2016 | Ulrey | F02D 41/3845 |
| 2018/0238262 A1* | 8/2018 | Takase | F02M 55/02 |
| 2022/0082059 A1* | 3/2022 | Pursifull | F02D 41/3863 |
| 2022/0290641 A1 | 9/2022 | Schroeder et al. | |

FOREIGN PATENT DOCUMENTS

| | | |
|---|---|---|
| DE | 102022205533 A1 | 11/2023 |
| EP | 2835518 A1 | 2/2015 |
| WO | 2019086659 A1 | 5/2019 |

* cited by examiner

FUEL INJECTOR CONTROL STRATEGY USING FUEL BULK MODULUS FOR FUEL INJECTOR COMMAND DETERMINATION

The present disclosure relates generally to a fuel injector control strategy, and more particularly to determining a fuel injector control command based upon a bulk modulus term for a fuel supplied to the fuel injector.

BACKGROUND

Dual fuel engine systems have been known for decades. Traditional engine systems typically utilize a single fuel type such as diesel, gasoline, or natural gas. In a dual fuel engine system two different fuels, potentially including varying blends of two different fuels, each having different properties, are typically combusted together in an engine cycle. Dual fuel engines may also be equipped to operate upon only a single one of two available fuels or potentially even more than two available fuels.

One strategy widely adopted and commercially available employs a relatively small pilot charge of a compression-ignition fuel such as diesel to ignite a relatively larger main charge of a gaseous fuel such as natural gas. The diesel fuel is relatively easily ignited by way of an increased temperature and pressure in a cylinder, with the ignition of the diesel triggering ignition of a more difficult to ignite gaseous fuel.

In recent years, engineers have begun to experiment with dual liquid fuel strategies employing a compression-ignition liquid fuel and a main charge of another liquid fuel. U.S. Pat. No. 11,384,721B1 proposes a strategy that may operate by injecting a first fuel such as diesel and a second fuel such as methanol from the same passage into an engine cylinder for combustion. While dual liquid fuel strategies show much promise, numerous challenges remain to obtaining optimal performance, particularly with regard to the inevitable switching between fuel types that occurs during operation.

SUMMARY

In one aspect, a dual fuel system includes a fuel injector having therein a plunger cavity, and a fuel pressurization plunger. The dual fuel system further includes a fueling control unit coupled to the fuel injector and structured to determine a volume change value (dV) for a fuel pressurized in the fuel injector via advancing the plunger in the plunger cavity, and to determine a pressure change value (dP) for the fuel. The fueling control unit is further structured to calculate a fuel bulk modulus term based upon dV and dP, and to determine a fuel injector control command based upon the fuel bulk modulus term.

In another aspect, a method of operating a fuel system includes advancing a plunger in a plunger cavity in a fuel injector to pressurize a fuel in the plunger cavity while the fuel injector is deadheaded. The method further includes determining a volume change value (dV) for the fuel, and determining a pressure change value (dP) for the fuel. The method still further includes outputting a fuel injector control command based upon dV and dP, and opening an injection valve in the fuel injector responsive to the fuel injector control command to inject the fuel into a cylinder in an engine.

In still another aspect, a fuel control system includes a fueling control unit structured via control communication with a fuel injector to determine a volume change value (dV) for a fuel pressurized in the fuel injector, and to determine a pressure change value (dP) for the fuel pressurized in the fuel injector. The fueling control unit is further structured to calculate a fuel bulk modulus term indicative of a fuel type of the fuel, based upon dV and dP, and to determine a fuel injector control command for outputting to the fuel injector to control at least one of an injection pressure or an injection timing of the fuel, based upon the fuel bulk modulus term.

DETAILED DESCRIPTION

Figure 1:
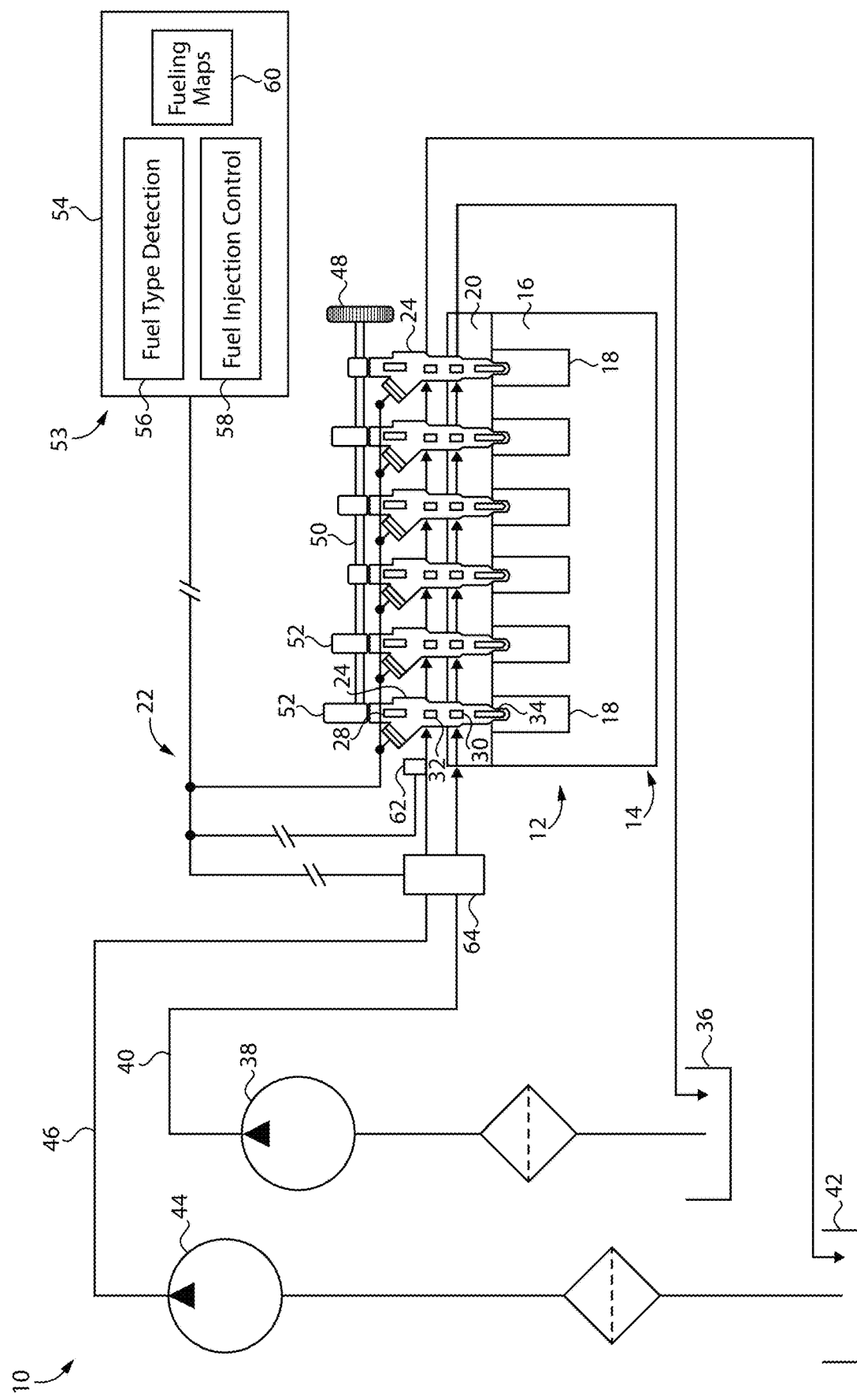
FIG. 1 is a diagrammatic view of a dual fuel internal combustion engine system, according to one embodiment.

Referring to FIG. 1, there is shown a dual fuel internal combustion engine system 10, according to one embodiment. Engine system 10 includes a dual fuel engine 12 having an engine housing 14 with a cylinder block 16 and a cylinder head 20 attached to cylinder block 16. A plurality of combustion cylinders 18 are formed in cylinder block 16. Cylinders 18 can be of any number and in any suitable arrangement, such as an inline pattern, a V-pattern, or still another. Engine system 10 may be applied for any known purpose including operating a pump, a compressor, an electrical generator or a driveline in a land vehicle or a marine vessel, to name a few examples. A plurality a pistons will be positioned in cylinders 18 and movable in a generally conventional manner between a top-dead-center position and a bottom-dead-center position to rotate a crankshaft coupled to a load.

Engine system 10 further includes a dual fuel system 22. It should be appreciated that a "dual" fuel system as contemplated herein does not exclude a fuel system configured to operate on more than two types of fuel nor even a fuel system that is substantially agnostic to fuel type. Fuel system 22 includes a plurality of fuel injectors 24, typically interchangeable for service as direct injectors each extending into a respective one of cylinders 18. Fuel injectors 24, hereinafter referred to, at times, in the singular, each include a fuel pressurization plunger 28. Fuel injector 24 also includes an injection control valve 30, a spill valve 32, and an outlet check 34. Injection control valve 30 and spill valve 32 may be electrically actuated to control a timing and a manner of fuel pressurization and fuel injection as further discussed herein.

Those skilled in the art will be familiar with operating a fuel injector to vary a closing hydraulic pressure on outlet check 34 (direct control) to start fuel injection and to end fuel injection. Operation of injection control valve 30, spill valve 32, and outlet check 34 to pressurize and inject fuel may occur in a generally conventional manner. As will be further apparent from the following description, fuel system 22 is also configured for diagnostic operation, typically when "deadheaded" such that outlet check 34 remains closed, to detect what fuel is presently being supplied to fuel injector 24 so as to optimally determine fuel injector control commands.

Fuel system 22 may further include a first fuel supply 36, a first fuel pump 38, and a first fuel supply conduit 40 structured to feed a first fuel contained in first fuel supply 36 to engine 12. Fuel system 22 further includes a second fuel supply 42, a second fuel pump 44, and a second fuel supply conduit 46 to convey a second fuel contained in second fuel supply 42 to engine 12. The terms "first," "second," and similar descriptors are used herein illustratively and do not define any particular ordering, arrangement, sequence, or identity of functions or apparatus. In one implementation, first fuel supply 36 contains a compression-ignition fuel, such as a diesel distillate fuel, and second fuel supply 42 contains an alcohol fuel, such as methanol. Fuel system 22 also includes a cam gear 48 coupled to a camshaft 50 including a plurality of cams 52. Rotation of camshaft 50 can rotate cams 52 to actuate fuel pressurization plungers 28 in each respective fuel injector 24 according to generally known principles.

Fuel system 22 may further include a fuel admission valve assembly 64. Valve assembly 64 may control a feed of fuel through first fuel supply conduit 40, through second fuel supply conduit 46, or both, to fuel injectors 24 and typically by way of cylinder head 20. It is contemplated that engine 12 may be operated some of the time on the first fuel, such as diesel fuel, in a so-called diesel only mode, or some of the time upon the second fuel, such as methanol. Embodiments are contemplated where diesel fuel and methanol fuel are injected together into cylinders 18, with varying substitution ratios of the methanol to diesel. Use of diesel as a pilot fuel to compression-ignite and trigger ignition of a main charge of methanol is one implementation. In other instances, methanol might be injected alone and ignition triggered by way of a spark.

The present disclosure is not limited with regard to fuel type, fuel blend ratios, substitution ratios, or ignition strategy. Typically, a first fuel contained in first fuel supply 36 will include a higher cetane number fuel, and fuel contained in second fuel supply 42 will include a lower cetane number fuel. Other examples fuels that could be used in engine system 10 include gasoline, ethanol, JP8, biodiesel, dimethyl ether (DME) and various others. Valve assembly 64 may be structured to turn off supply of one fuel and turn on supply of another fuel, or potentially controllable to vary a blend ratio of multiple fuels. In any case, fuel admission valve assembly 64 is structured to selectively fluidly connect first fuel supply 36 or second fuel supply 42, or both, to fuel injectors 24. Fuel system 22 also includes a pressure transducer 62. Pressure transducer 62 may be located to measure a fuel pressure pulse outside of fuel injectors 24 and plunger cavities therein and caused by opening a respective spill valve 32, as further discussed herein.

Figure 2:
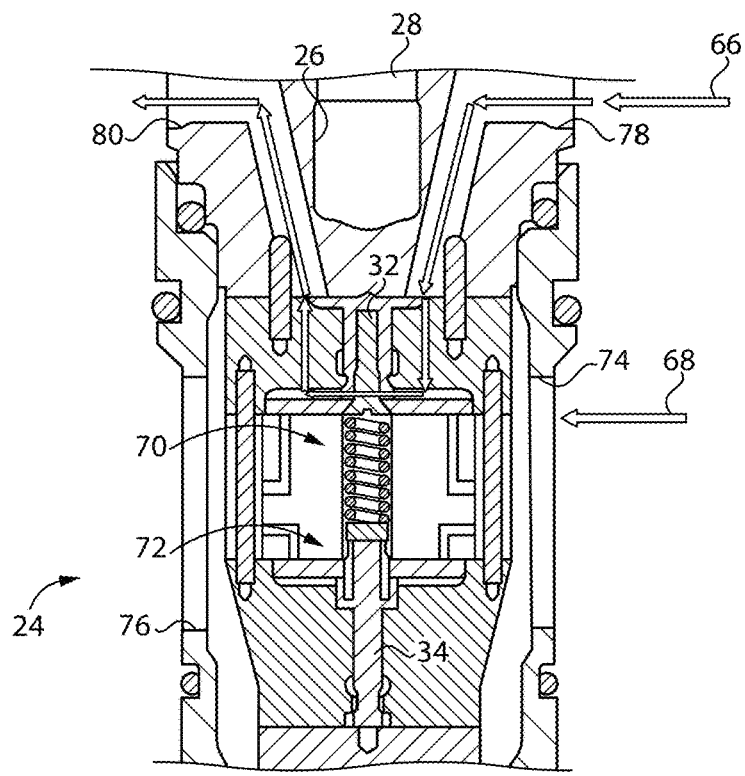
FIG. 2 is a sectioned side diagrammatic view of a portion of a fuel injector, according to one embodiment.

Referring also now to FIG. 2, there can be seen some additional features of fuel injector 24. Arrow 66 shows an incoming flow of fuel to a first fuel inlet 78. The flow of fuel shown via arrow 66 could include the first fuel, the second fuel, or a blend of both. Arrow 68 shows an incoming flow of fuel to a second fuel inlet 74. In the illustrated embodiment, the flow of fuel shown via arrow 68 may include the first fuel, conveyed to a tip of fuel injector 24 to serve as a leading fuel in a combined fuel charge as taught in the '721 patent referenced above. The fuel illustrated via arrow 66 advances through passages in fuel injector 24 to a first fuel outlet 80. The fuel illustrated by arrow 68 advances through fuel injector 24 around internal components, included in the illustrated example spill valve 32, and to a second fuel outlet 76. Fuel injector 24 can be operated to selectively admit fuel(s) shown via arrows 66 and 68 for pressurization and injection by way of known techniques.

Spill valve 32 can also be seen situated in fuel injector 24 in FIG. 2. Spill valve 32 can be actuated closed by way of energizing a spill valve electrical actuator 70 via an electrical control current. Injection control valve 34 can be actuated open by way of energizing an injection control valve electrical actuator 72. Fuel injector 24 also includes therein a plunger cavity 26. Plunger 28 is movable in plunger cavity 26 between an advanced position and a retracted position. When spill valve 32 is open reciprocation of plunger 28 causes fuel to be passively exchanged between plunger cavity 26 and the internal fuel passages connecting to fuel inlet 78 and fuel outlet 80. When spill valve 32 is closed, advancing of plunger 28 causes fuel to be pressurized in plunger cavity 26 and other internal passages in fuel injector 24. When injection control valve 34 is opened a closing hydraulic pressure on outlet check 34 can be relieved to permit opening of outlet check 34 to spray fuel into a respective cylinder 18.

It has been observed that different fuels and different fuel blends can behave and respond differently to pressurization. For example, methanol may be somewhat more compressible and "springy" than distillate diesel. Mixtures of methanol and diesel can have properties generally between diesel and methanol. During operation fuel type that is being fed to fuel injector 24 can change as discussed herein, switching from a diesel-only mode to a dual fuel mode, switching from a dual fuel mode to a diesel-only mode, or varying a blend ratio between those two fuels to name a few examples. It has further been observed that in view of these and other differences the timing and sometimes manner of operating components of fuel injector 24 should be varied to optimally operate for pressurization and injection of different types of fuel. It also may not be precisely known what fuel type is presently being used at the precise timing at which a fuel type change occurs. Moreover, fuels supplied from different sources can have varying properties even if ostensibly of the same type. According to the present disclosure, fuel system 22 is uniquely configured to detect a fuel type presently being supplied to fuel injector 24 and appropriately control fuel injector 24 for optimal operation.

To this end, fuel system 22 further includes a dual fuel control system 53. Control system 53 includes a fueling control unit 54 coupled to fuel injector 24 and in control communication therewith. Fueling control unit 54 may include one or more data processors of any suitable type such as a microprocessor, a microcontroller, or another, and a computer readable memory. Computer readable memory in fueling control unit 54 can include any suitable volatile or non-volatile memory and stores machine executable control instructions, maps, and other structures for operating fuel system 22. Any number of data processors and any number of memories arranged in any configuration might be used.

In the illustrated embodiment, fueling control unit 54 is shown storing a fuel type detection module or software 56, a fuel injector control module or software 58, and fueling maps 60. Fueling control unit 54 may utilize fuel injector control 58 for determining fuel injector control commands including control current durations and/or control current amplitudes, as determined by way of map lookups on fueling maps 60. Fueling maps 60 may include a plurality of fueling maps each specific to a different fuel. For example, fueling maps 60 may include a methanol map, a diesel map, and still others. Fuel type detection 56 may be utilized, at least periodically, to monitor a fuel type that is presently being supplied to fuel injector 24 so that a suitable fueling map can be selected for use in a map lookup to determine appropriate fuel injector control commands.

In one embodiment, fueling control unit 54 is structured to determine a volume change value (dV) for a fuel pressurized in fuel injector 24 via advancing plunger 28 in plunger cavity 26. Fueling control unit 54 is further structured to determine a pressure change value (dP) for a fuel, and to calculate a fuel bulk modulus term based upon dV and dP. Fueling control unit 54 can then in turn determine a fuel injector control command based upon the fuel bulk modulus term. As suggested above, fueling control unit 54 may be structured to determine the fuel injector control command via a map lookup on a fueling map selected on the basis of the fuel bulk modulus term. The fueling map may be selected from among the plurality of stored fueling maps each specific to a different fuel or a different fuel blend.

As also suggested above, different fuels can behave and respond differently to pressurization in fuel injector 24. The fuel bulk modulus term includes a quantitative or qualitative term representing a determination or an approximation of an actual bulk modulus of a fuel presently within fuel injector 24, thus indicative of what type of fuel is presently being used. The following Equation 1 represents calculation of the fuel bulk modulus term k:

$$k = -V \frac{dP}{dV}$$

Figure 3:
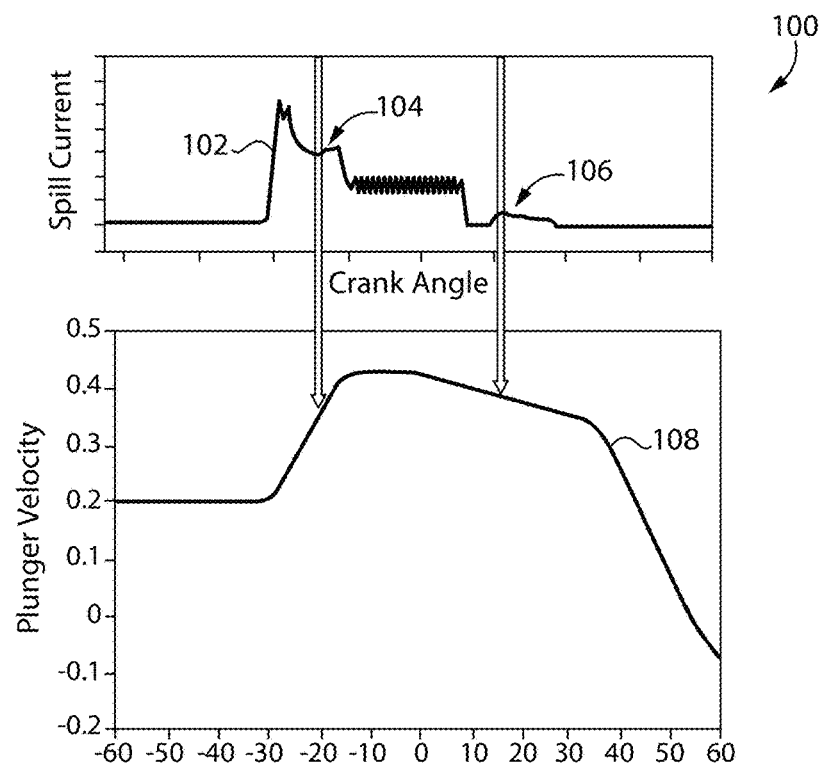
FIG. 3 is an overplot showing spill current and plunger velocity.

Calculation of the fuel bulk modulus term may be performed by executing several steps. Referring also now to FIG. 3, there is shown an overplot 100 illustrating spill current 102 relative to plunger velocity 108. Numeral 104 shows a spill valve arrival time (VAT) and numeral 106 shows a spill valve return time (VRT). The volume change value dV can be calculated based upon the following Equation 2:

$$dV = \text{Volume@}VAT - \text{Volume@}VRT$$

Figure 4:
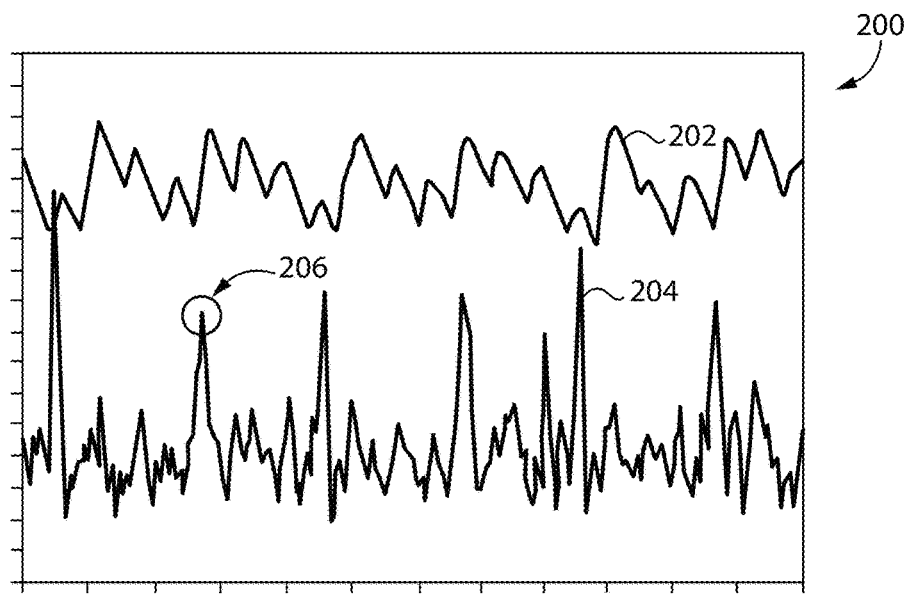
FIG. 4 is a graph showing fuel pressure supply to a cylinder head and fuel pressure pulses from the cylinder head.

Using Equation 2, the difference in volume dV caused by advancing plunger 28 between VAT and VRT is calculated. Since the relationship between plunger 28 and crank angle is known or determinable, dV can be calculated by determining the volume change in plunger cavity 26 between the point in time at which spill valve 32 is closed VAT and the point at time in which spill valve 32 opens at VRT. Thus, dV is determined based upon spill valve timing parameters. Referring also to FIG. 4, fueling control unit 54 can then determine the pressure change valve or dP for the fuel. FIG. 4 shows a fuel pressure trace 202 representing fueling supplied to cylinder head 20. Trace 204 shows pressure that is sensed from cylinder head 20 in response to opening spill valve 32. Numeral 206 shows a spill pressure spike or pulse. In an embodiment, dP can be measured via pressure transducer 62 directly. With dP and dV determined, the bulk modulus term k can be calculated based upon the preceding Equation 1. Other strategies can include comparing pressure measurements outside of the spill pulse, for example, determining a pressure pulse amplitude compared to a reference pressure, with the spill pressure pulse amplitude being indicative of one known fuel type versus another known fuel type. Fuel injector 24 could be operated on a known fuel type and data gathered so as to empirically develop a profile of an expected spill pressure pulse amplitude compared to a reference pressure, especially for a given fuel system. Such a characterization could be developed over a plurality of measuring cycles in situ. Another strategy can be based around assumptions as to a diesel fuel bulk modulus. For instance, if diesel bulk modulus is known, similarity or difference between a spill pressure pulse amplitude in comparison to an expected spill pressure pulse amplitude for diesel might be used to determine whether diesel or a different fuel is presently supplied and pressurized in fuel injector 24. Still other strategies using known or in situ determinable characteristics to determine a fuel bulk modulus term indicative of fuel type.

Figure 5:
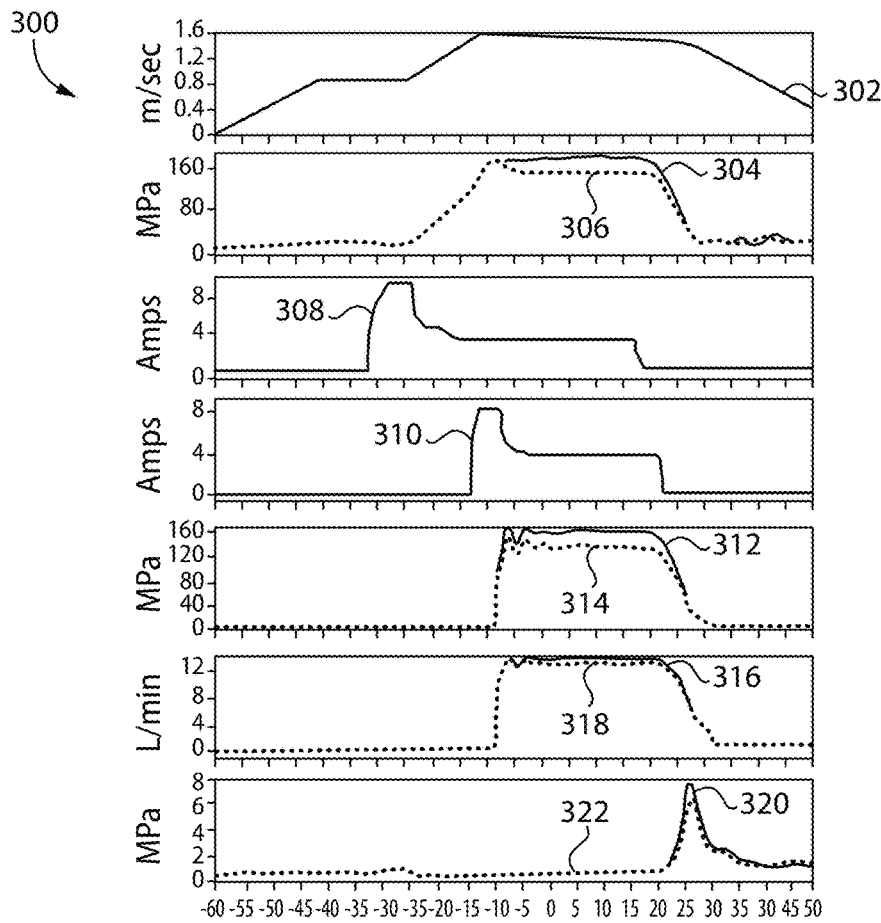
FIG. 5 is a graph illustrating fuel system states and events during example fuel injections of two different fuels.

Referring now to FIG. 5 there is shown a graph 300 illustrating engine/fuel system events and states during operation. In graph 300, numeral 302 shows cam velocity. Numeral 304 shows a rocker pressure using diesel fuel, and numeral 306 shows rocker pressure using methanol. It can be noted the rocker pressure for diesel is higher based upon the different behavior of diesel versus methanol, e.g. less "springiness" of diesel. Numeral 308 shows spill current, and numeral 310 shows direct operated check (DOC) current. Numeral 312 shows sac pressure using diesel, and numeral 314 shows sac pressure using methanol. A rate trace for diesel is shown at 316 in comparison to a rate trace for methanol at 318. Numeral 320 shows a pressure spike from closing and opening the spill valve and numeral 322 shows a pressure spike for closing and opening the spill valve using diesel. It can be noted the pressure spike for diesel is greater than the pressure spike for methanol, again reflecting different properties of the fuels.

INDUSTRIAL APPLICABILITY

Figure 6:
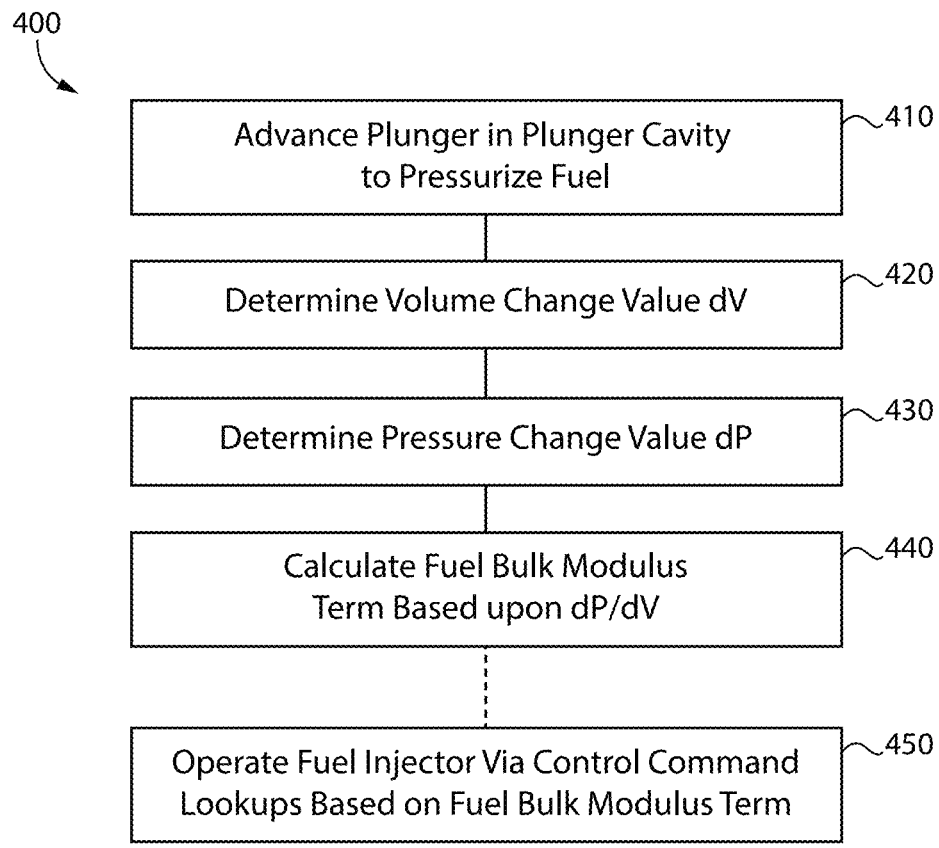
FIG. 6 is a flowchart illustrating example methodology and logic flow, according to one embodiment.

Referring to the drawings generally, but now focusing on FIG. 6, there is shown a flowchart 400 illustrating example methodology and logic flow. In flowchart 400, at a block 410 plunger 28 is advanced in plunger cavity to pressurize a fuel therein. At this point, fuel injector 24 is "deadheaded" meaning that outlet check 34 will remain closed and injection control valve 30 will not be actuated. From block 410, flowchart 400 advances to a block 420 to determine the volume change value dV. From block 420 flowchart 400 advances to a block 430 to determine the pressure change value dP.

From block 430 flowchart 400 advances to a block 440 to calculate the fuel bulk modulus term based upon dP/dV. With the fuel bulk modulus term thusly calculated, fuel injector 24 can be operated, now no longer deadheaded, via outputting a fuel injector control command determined via a map lookup based on the fuel bulk modulus term. Responsive to the fuel injector control command, an injection valve, such as outlet check 34, in fuel injector 24 can be opened to inject the fuel into a respective cylinder 18 in engine 12. The fuel injector control command can control at least one of an injection pressure or an injection timing according to the present disclosure. In some embodiments, a bulk modulus term, and a fuel injector control command based thereon, might be used to control fuel injection rate shape.

During operating engine system 10 fuel type may be switched periodically, in response to load demands, fuel availability or fuel quality, or emissions mitigation, for example. Thus, a first fuel may be injected in a first engine cycle using a first fuel injector control command determined via map lookup on a first fueling map, based on a first determined bulk modulus term. Subsequently, the fuel type may be switched again, and a second fuel bulk modulus term calculated and used in a second map lookup on a second fueling map. A second fuel injector control command can be determined, and an injection valve opened again to inject a second fuel responsive to the second fuel injector control command in a second engine cycle. Fuel type determination according to the present disclosure might take place periodically, such as every few seconds or minutes or every few engine cycles, or based on some other signal or determination such as monitoring engine operation or performance that indicates fuel type determination is desired.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A dual fuel system comprising:
   a fuel injector including therein a plunger cavity, an injection valve, and a fuel pressurization plunger;
   a fueling control unit coupled to the fuel injector and structured to:
   determine a volume change value (dV) for a fuel containing at least one of a first fuel and a second fuel, pressurized in the fuel injector via advancing the plunger in the plunger cavity, while the fuel injector is deadheaded such that the injection valve remains closed;
   determine a pressure change value (dP) for the fuel containing at least one of the first fuel and the second fuel;
   calculate a fuel bulk modulus term based upon dV and dP;
   determine a fuel injector control command based upon the fuel bulk modulus term; and
   output the fuel injector control command to the fuel injector.

2. The dual fuel system of claim 1 wherein the fuel injector includes a cam coupled to the plunger, and a spill valve, and the fueling control unit is structured to determine dV based upon valve timing parameters of the spill valve.

3. The dual fuel system of claim 2 further comprising a pressure transducer, and wherein the fueling control unit is further structured to determine dP based upon a fuel pressure measurement of the pressure transducer.

4. The dual fuel system of claim 3 wherein the pressure transducer is located to sense a fuel pressure pulse outside of the plunger cavity and caused by opening the spill valve.

5. The dual fuel system of claim 4 wherein the fueling control unit is further structured to calculate dP via comparing the sensed fuel pressure pulse to a reference fuel pressure.

6. The dual fuel system of claim 5 wherein the reference fuel pressure is determined in situ.

7. The dual fuel system of claim 1 wherein the fueling control unit is further structured to determine the fuel injector control command via a map lookup on a fueling map selected on the basis of the fuel bulk modulus term.

8. The dual fuel system of claim 7 wherein the fueling control unit is further structured to select, based on the fuel bulk modulus term, the fueling map from among a plurality of stored fueling maps each specific to a different fuel or a different fuel blend.

9. The dual fuel system of claim 1 further comprising a first fuel supply containing the first fuel, a second fuel supply containing the second fuel, and a fuel admission valve assembly structured to selectively fluidly connect the first fuel supply or the second fuel supply to the fuel injector.

10. The dual fuel system of claim 9 wherein the first fuel includes a higher cetane number fuel, and the second fuel includes a lower cetane number fuel.

11. A method of operating a fuel system comprising:
    advancing a plunger in a plunger cavity in a fuel injector to pressurize a fuel in the plunger cavity, while the fuel injector is deadheaded such that an injection valve of the fuel injector remains closed;
    determining a volume change value (dV) for the fuel;
    determining a pressure change value (dP) for the fuel;
    outputting a fuel injector control command based upon dV and dP; and
    opening an injection valve in the fuel injector responsive to the fuel injector control command to inject the fuel into a cylinder in an engine.

12. The method of claim 11 further comprising calculating a fuel bulk modulus term based on dV and dP, and determining the fuel injector control command, based on the fuel bulk modulus term, via a map lookup on a fueling map specific to the fuel.

13. The method of claim 12 wherein the fuel includes a first fuel injected in a first engine cycle, and further comprising calculating a second fuel bulk modulus term, determining a second fuel injector control command, based on the second fuel bulk modulus term, via a map lookup on a second fueling map specific to a second fuel, and opening the injection valve responsive to the second fuel injector control command to inject the second fuel in a second engine cycle.

14. The method of claim 13 wherein the first fuel includes a higher cetane number fuel and the second fuel includes a lower cetane number fuel.

15. The method of claim 11 further comprising sensing a fuel pressure pulse, and wherein the determining dP includes determining dP based on the sensed fuel pressure pulse.

16. The method of claim 15 wherein the sensed fuel pressure pulse is produced by opening a spill valve in the fuel injector.

17. The method of claim 15 wherein the determining dP includes comparing the sensed fuel pressure pulse to a reference fuel pressure.

18. The method of claim 11 wherein the determining dV includes determining dV based on a valve arrival timing and a valve return timing of the spill valve.

19. A fuel control system comprising:
    a fueling control unit structured via control communication with a fuel injector to:
    determine a volume change value (dV) for a fuel pressurized in the fuel injector via advancing a plunger in a plunger cavity in the fuel injector, while the fuel injector is deadheaded such that an injection valve of the fuel injector remains closed;
    determine a pressure change value (dP) for the fuel pressurized in the fuel injector;
    calculate a fuel bulk modulus term indicative of a fuel type of the fuel, based upon dV and dP;
    determine a fuel injector control command for outputting to the fuel injector to control at least one of an injection pressure or an injection timing of the fuel, based upon the fuel bulk modulus term; and output the fuel injector control command to the fuel injector.

20. The fuel system of claim 19 wherein:

the fueling control unit is further structured to determine the fuel injector control command via a map lookup on a fueling map; and select, based on the fuel bulk modulus term, the fueling map from among a plurality of stored fueling maps each specific to a different fuel or a different fuel blend.

* * * * *